(12) United States Patent
Sugiyama

(10) Patent No.: US 8,274,716 B2
(45) Date of Patent: Sep. 25, 2012

(54) IMAGE READING APPARATUS AND METHOD OF CONTROLLING THE SAME

(75) Inventor: Takayuki Sugiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 12/403,862

(22) Filed: Mar. 13, 2009

(65) Prior Publication Data

US 2009/0231641 A1 Sep. 17, 2009

(30) Foreign Application Priority Data

Mar. 13, 2008 (JP) ................................. 2008-063920

(51) Int. Cl.
  *H04N 1/04* (2006.01)
  *H04N 1/38* (2006.01)
(52) U.S. Cl. ........ 358/514; 358/512; 358/525; 358/530; 358/505; 358/509; 358/474; 358/482; 358/483; 358/463
(58) Field of Classification Search .................. None
  See application file for complete search history.

(56) References Cited

U.S. PATENT DOCUMENTS

| 5,969,346 | A   | * | 10/1999 | Nagasaka et al. ............. 250/234 |
|-----------|-----|---|---------|--------------------------------------|
| 6,307,661 | B1  | * | 10/2001 | Fujibayashi et al. ........ 359/207.1 |
| 6,987,594 | B2  | * | 1/2006  | Takayama ................... 359/207.1 |
| 7,180,642 | B2  | * | 2/2007  | Miyatake ....................... 358/513 |
| 7,397,620 | B2  | * | 7/2008  | Hayashide et al. ............ 359/896 |
| 7,684,094 | B2  | * | 3/2010  | Tochigi et al. ................. 358/510 |
| 2002/0163739 | A1 |  | 11/2002 | Hayashide et al. ............ 359/720 |
| 2008/0062475 | A1 |  | 3/2008  | Sugiyama et al. ............. 358/475 |
| 2011/0279881 | A1 | * | 11/2011 | Saiga ........................ 359/207.1 |

FOREIGN PATENT DOCUMENTS

| JP | 3-113961 | 5/1991 |
| JP | 2000-171705 | 6/2000 |
| JP | 2000-307800 | 11/2000 |
| JP | 2001-203900 | 7/2001 |
| JP | 2001203900 A | * 7/2001 |
| JP | 2003-255475 | 9/2003 |

OTHER PUBLICATIONS

Notification of Ground of Rejection dated Jan. 10, 2012, in counterpart Japanese Patent Application No. 2008-063920, and excerpted translation thereof.

* cited by examiner

*Primary Examiner* — Cheukfan Lee
(74) *Attorney, Agent, or Firm* — Fitzpatrick, Cella, Harper & Scinto

(57) ABSTRACT

An image reading apparatus includes a reading system having a plurality of line sensors extending in a main-scan direction, an imaging optical system for imaging, on the line sensors, imagewise information of an original surface, the imaging optical system including at least one anamorphic optical surface having different powers in the main-scan direction and the sub-scan direction, a scanning system for relatively scanning the original surface and the reading means in a sub-scan direction to read the imagewise information of the original surface, and an image correcting system for correcting imagewise information of the original surface read by each line sensor, on the basis of an imaging-position-deviation correction amount of an image in the sub-scan direction corresponding to a reading position in the main-scan direction, calculated based on an imaging position deviation amount of an image in the sub-scan direction corresponding to the reading position in the main-scan direction upon the line sensors, as calculated from optical design value of the imaging optical system.

4 Claims, 9 Drawing Sheets

IMAGE READING APPARATUS AND METHOD OF CONTROLLING THE SAME

FIELD OF THE INVENTION AND RELATED ART

This invention relates to an image reading apparatus. More particularly, the invention is suitably usable in a color image reading apparatus suitably applicable to an image scanner, a digital copying machine or a facsimile machine, for example, using a plurality of image pickup devices such as CCDs to perform high-precision image reading.

Conventionally, in image reading apparatuses such as a flatbed-type image scanner or a digital copying machine, an imaging lens and a line sensor are held fixed while, on the other hand, only a plurality of reflecting mirrors are moved in a sub-scan direction to perform slit-exposure of the surface of an original, whereby imagewise information of the original is read out.

In recent years, in an attempt to simplify the structure, carriage type image reading apparatuses in which a plurality of mirrors, an imaging optical system and line sensors are integrated to scan the surface of an original, has been used in many applications (see patent document No. 1).

FIG. 12 is a schematic diagram of a main portion of a conventional image reading apparatus of carriage type.

In the diagram, a light beam emitted from an illumination source 53 illuminates an original 51 directly or via a light reflector 59. The reflected light beam from the original 51 goes by way of first, second, third and fourth reflecting mirrors 54a, 54b, 54c and 54d, such that the light path of the light beam is bent inside the carriage 57. The light beam along the light path so bent is imaged by an imaging optical system 56 upon the surface of a linear image sensor (hereinafter "CCD") 55 such as a color CCD (Charge Coupled Device) which is comprised of a plurality of line sensors. By moving the carriage 57 in the direction of an arrow A (sub-scan direction) shown in FIG. 12 by means of a driving device such as a motor 58, the imagewise information of the original 51 is read out.

The CCD 55 shown in the diagram comprises a plurality of light receiving elements (picture elements) arrayed in a one-dimensional direction (main-scan direction).

In the structure described above, the carriage 57 has to be made small in size in order to reduce the size of the image scanner. Reduction in size of the carriage 57 may be done by a method in which the number of reflecting mirrors is increased, and the light path is bent to secure the optical path length; or alternatively by a method in which light is reflected plural times by a single reflecting mirror to secure the optical path length.

With these methods, however, since the inside structure of the carriage 57 would be complicated, there arises a problem that more severe assembling precision is exerted. Furthermore, there is another problem that the imaging performance deteriorates in proportion to the surface precision of the reflecting mirror and the number of reflection times of light, putting adverse influence on the picture quality.

On the other hand, the field angle of the imaging optical system 56 may be widened to shorten the object-to-image distance.

Conventionally, as for a wide-field-angle imaging lens comprised of lenses of a practical number as a dioptric system (lens optical system) and having spherical surface shape, a large variety of types have been proposed.

However, in any of theses, around 25 degrees in terms of the half field angle is an upper limit. If the lens is widened more than this, a problem arises that the field curvature and astigmatism become too large and sufficient optical performance cannot be shown.

In consideration of this, an image reading apparatus has been proposed in which an anamorphic surface comprised of at least one surface having a revolutionally asymmetrical shape with respect to an optical axis is introduced into an imaging optical system, to avoid the aforementioned problem (see patent document No. 2).

In patent document No. 2, an anamorphic surface is used to constitute an imaging optical system, by which field curvature aberration is effectively corrected and superior contrast performance is obtained.

However, in patent document No. 2, there is a problem that, due to the provision of an anamorphic surface, the imaging magnification, particularly, the imaging magnification in the sub-scan direction changes from an axial portion to a peripheral portion.

Because of this, in the case of image reading using three line sensors comprised of three line sensors for of R, G and B colors, the imaging position onto outside line sensors in the sub-scan direction (e.g., line sensors for R and B colors) will deviate in the sub-scan direction from an axial portion to a peripheral portion.

This leads to an inconvenience that color drift of an image occurs in the sub-scan direction.

A proposal has been made with regard to this problem, in which the aforementioned inconvenience is avoided by suppressing the distortion component of an imaging lens in the sub-scan direction and by the specification of line sensors (see patent document No. 3).

[Patent Documents]
  No. 1: Japanese Laid-Open Patent Application No. 3-113961
  No. 2: Japanese Laid-Open Patent Application No. 2000-171705
  No. 3: Japanese Laid-Open Patent Application No. 2000-307800

SUMMARY OF THE INVENTION

In the image reading apparatus disclosed in patent document No. 3, the image reading is carried out mainly with the resolution of about 600 dpi, and the length of one side of the line sensor (reading means) per a single pixel is around 7-8 μm.

However, in recent image reading apparatuses, higher-resolution image reading function has been required. For example, in the image reading of a resolution 2400 dpi, the length of one side of the line sensor per a single pixel should be around 1.8 to 2.7 μm. Thus, a precision of about 3 to 5 times higher has been required.

Furthermore, in addition to the requirement of higher resolution, reduction in size of the overall system and improvements of the picture quality have been required. Thus, with regard to the field angle of the imaging optical system (image reading lens) as well, the field angle should be widened while suppressing the field curvature aberration.

This necessitates that a surface having strong anamorphic characteristic is used in the imaging optical system. Hence, the precision required for the image reading is almost 10 times higher.

Taking these situations into account, it is required in an imaging optical system to approximately completely correct the magnification in the sub-scan direction. However, to correct it while balancing with the field curvature aberration is very difficult to do.

The present invention provides an image reading apparatus by which color drift in the sub-scan direction resulting from a magnification error in the sub-scan direction can be corrected very precisely.

In accordance with an aspect of the present invention, there is provided an image reading apparatus, comprising: reading means having a plurality of line sensors extending in a main-scan direction; an imaging optical system configured to image, on the line sensors, imagewise information of an original surface, said imaging optical system including at least one anamorphic optical surface having different powers in the main-scan direction and the sub-scan direction; scanning means configured to relatively scan the original surface and said reading means in a sub-scan direction to read the imagewise information of the original surface; and image correcting means configured to correct imagewise information of the original surface read by each of the line sensors, on the basis of an imaging-position-deviation correction amount of an image in the sub-scan direction corresponding to a reading position in the main-scan direction, calculated based on an imaging position deviation amount of an image in the sub-scan direction corresponding to the reading position in the main-scan direction upon the line sensors, as calculated from optical design value of said imaging optical system.

The image reading apparatus may further comprise memory means configured to store the imaging position deviation amount of an image in the sub-scan direction corresponding to the reading position in the main-scan direction upon the line sensors as calculated from the optical design value of said imaging optical system, and correction amount calculating means configured to calculate the imaging-position-deviation correction amount of each of a plurality of picture elements of each line sensor of the plurality of line sensors from the imaging position deviation amount of each picture element of the plurality of picture elements in each line sensor, as calculated using an interpolation correction coefficient having been calculated using a linear interpolation function from the imaging position deviation amount of an image in the sub-scan direction corresponding to the reading position in the main-scan direction stored in said memory means.

In accordance with another aspect of the present invention, there is provided a method of controlling an image reading apparatus including reading means having a plurality of line sensors extending in a main-scan direction, an imaging optical system configured to image, on the line sensors, imagewise information of an original surface, the imaging optical system including at least one anamorphic optical surface having different powers in the main-scan direction and the sub-scan direction, said method comprising: relatively scanning the original surface and the reading means in a sub-scan direction to read the imagewise information of the original surface; and correcting imagewise information of the original surface read by each of the line sensors, on the basis of an imaging-position-deviation correction amount of an image in the sub-scan direction corresponding to a reading position in the main-scan direction, calculated based on an imaging position deviation amount of an image in the sub-scan direction corresponding to the reading position in the main-scan direction upon the line sensors, as calculated from optical design value of said imaging optical system.

The method may further comprise calculating the imaging-position-deviation correction amount of each of a plurality of picture elements of each line sensor of the plurality of line sensors from the imaging position deviation amount of each picture element of the plurality of picture elements in each line sensor, as calculated using an interpolation correction coefficient having been calculated using a linear interpolation function from the imaging position deviation amount of an image in the sub-scan direction corresponding to the reading position in the main-scan direction stored in said memory means.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

An image reading apparatus according to the present embodiment comprises an imaging optical system having at least one anamorphic surface for focusing an image of the surface of the original, and reading means having a plurality of line sensors disposed at the imaging position of the imaging optical system. The original surface and the reading means are relatively scanned in a direction perpendicular to the array direction of the picture elements of the line sensors, to read the imagewise information on the original.

When an image of a single line on the original surface is imaged on the line sensors by the imaging optical system, an image of a single line to be read by an arbitrary line sensor is taken as a reference.

Here, the amount of deviation of the imaging position between an image of a single line to be read by another line sensor and the image of the single line which is the reference, in the direction perpendicular to the array direction of the picture elements, is stored into memory means.

Furthermore, linear interpolation is made to the imaging position deviation amount stored in the memory means by using correction amount calculating means, and an imaging position deviation correction amount is calculated. Based on the imaging position deviation correction amount calculated by the correction amount calculating means, the imagewise information of the original is corrected by image correcting means.

Now, preferred embodiments of the present invention will be described with reference to the attached drawings.

[Embodiment 1]

Figure 1:
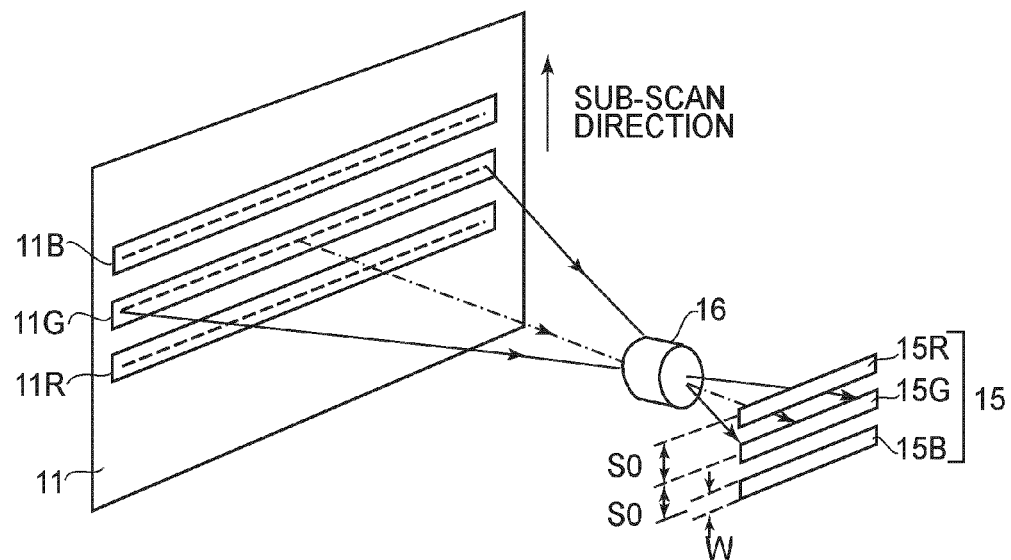
FIG. 1 is a schematic diagram illustrating a basic structure of an optical system of a color image reading apparatus according to a first embodiment of the present invention.

FIG. 1 is a schematic diagram illustrating the basic structure of an optical system of an image reading apparatus according to an embodiment of the present invention.

In the following description, the term "main-scan direction" refers to the direction along which picture elements of the line sensors are arrayed. The term "sub-scan direction" refers to the direction which is perpendicular to the array direction of the picture elements of the line sensors.

In FIG. 1, denoted at 11 is an original on which a color image is formed. Denoted at 11R, 11G and 11B are reading ranges which are made conjugate with line sensors (CCDs) 15R, 15G and 15B (as reading means to be described below), respectively, upon the surface of the original 11.

Denoted at 16 is an imaging optical system which is comprised of a dioptric system including an anamorphic surface (refracting surface) with at least one surface of a rotationally asymmetric shape with respect to the optical axis.

The anamorphic surface is a surface having a refracting power (power) both in the main-scan direction and the sub-scan direction, and yet the refracting powers are different between the main-scan direction and the sub-scan direction.

The imaging optical system 16 images a light beam based on the imagewise information of the original 11 (image of a single line on the original surface), upon reading means 15 to be described below.

It is to be noted that the imaging optical system 16 is not limited to a dioptric system. For example, the present invention is applicable even if it is a catoptric system consisting off-axial reflection surfaces.

The off-axial reflection surface can be defined as such reflection surface that, when a reference axis extending along a light ray passing through an image center and a pupil center is considered, a surface normal at the point of intersection with the reference axis of the structural surface is not present on the reference axis.

Denoted at 15 is reading means which comprises three monolithic line sensors wherein three line sensor 15R, 15G and 15B are disposed on the same board surface so that they are parallel to each other.

Color filters (not shown) based on colored lights (e.g., red (R), green (G), blue (B)) are provided on the surfaces of the three line sensors.

These line sensors 15R, 15G and 15B have a width W in the widthwise direction, and these are disposed with a line spacing S0 interposed therebetween.

By using these three line sensors 15R, 15G and 15B, different color information (imagewise information of colors) (e.g., R, G and B) is read sequentially.

Figure 2:
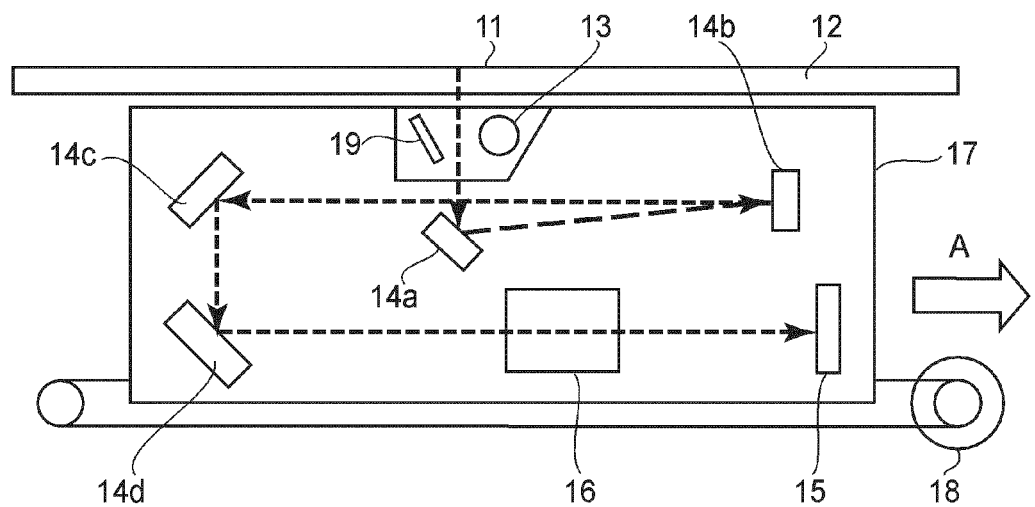
FIG. 2 is schematic diagram of a main portion of a color image reading apparatus according to the first embodiment of the present invention.

FIG. 2 is a schematic diagram of a main portion of an image reading apparatus according to the present invention, when the same is applied to a color image forming apparatus such as an image scanner or a copying machine.

In FIG. 2, like numerals are assigned to components corresponding to those of FIG. 1.

In FIG. 2, denoted at 12 is an original table glass, and an original 11 is put on the surface. Denoted at 17 is a carriage (unit) which accommodates therein illumination source 13, light reflector 19, a plurality of reflecting mirrors 14a, 14b, 14c and 14d, an imaging optical system 16 and reading means 15 as a unit.

The carriage 17 is scanningly moved in the sub-scan direction (a direction of an arrow A in FIG. 2) by a driving device such as a motor 18, to read the imagewise information of the original 11.

The illumination source 13 is comprised of a fluorescent lamp or halogen lamp, for example. The light reflector 19 reflects the light beam from the illumination source 13 to illuminate the original 11 efficiently.

Denoted at 14a, 14b, 14c and 14d are first, second, third and fourth reflecting mirrors, respectively. These mirrors function to bend the path of the light beam from the original 11, inside the carriage 17.

In FIG. 2, the light beam emitted from the illumination source 13 illuminates the original 11 directly or, alternatively, by way of the light reflector 19.

Then, the reflected light beam from the original 11 illuminated by the illumination source 13 is reflected by the first, second, third and fourth reflecting mirrors 14a, 14b, 14c and 14d, whereby the light path of the light beam is bent inside the carriage 17. Then, it is imaged on the surfaces of the three line sensors by the imaging optical system 16.

Then, by moving the carriage 17 in the direction of an arrow A (sub-scan direction) using the motor 18, the imagewise information of the original 11 is read.

In the image reading apparatus shown in FIG. 2, the carriage 17 scans the original 11 surface which is held stationary. However, this carriage scan is equivalent to that the three line sensors 15 and the imaging optical system 16 are held stationary while the original 11 surface moves, as shown in FIG. 1.

By scanning the original 11 surface, the same point can be read sequentially with respect to different colors with certain time intervals.

In the structure described above, the imaging optical system 16 having an anamorphic surface has a magnification error in the sub-scan direction as described above. As a result of this, if the line sensor 15G is taken as a reference, the line image (image of a single line) imaged on the line sensors 15B and 15R would have an imaging position deviation, such as shown in FIG. 3.

Figure 3:
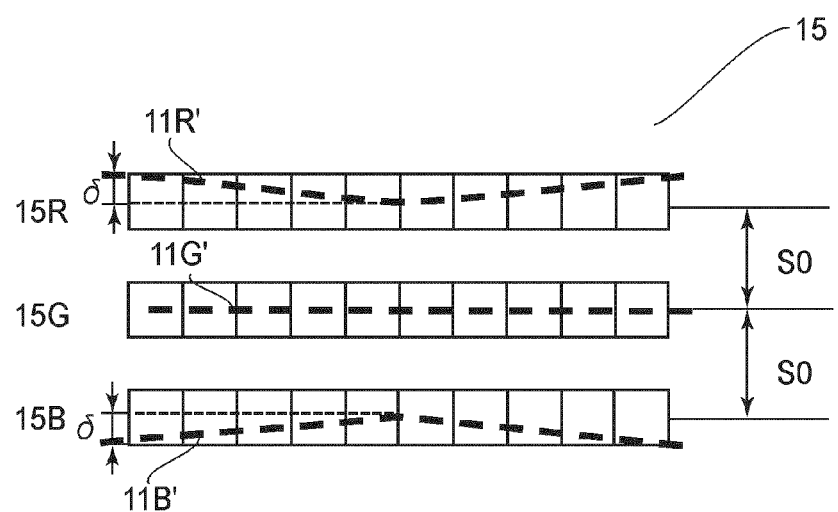
FIG. 3 is a schematic diagram illustrating the deviation of imaging position of a line on the line sensor surface, in the first embodiment of the present invention.

FIG. 3 is a schematic diagram illustrating the outline of the imaging position deviation of line images when the image of a single line on the original surface is imaged on the three line sensors 15.

In FIG. 3, like numerals are assigned to components corresponding to those of FIG. 1.

In the diagram, images of lines 11R', 11G' and 11B' on the original surface, being imaged on the line sensors 15R, 15G and 15B are depicted by dotted lines.

Particularly, if the field angle is made large, the imaging position deviation occurs more easily. If the distance between the original surface and the line sensors is shortened, it increases the field angle. Therefore, the positional deviation of the line image being imaged on the line sensor surface would be increased thereby.

If the positional deviation of the line image being imaged is large, it causes strong color drift when different color images are superposed one upon another.

In the diagram, denoted at δ is the amount of deviation of the image (imaging position deviation amount) in the sub-scan direction depending on the reading position with respect to the main-scan direction.

Next, referring to FIG. 4 and FIG. 5, the manner of correcting the imaging position deviation δ in the sub-scan direction depending on the reading position with respect to the main-scan direction, in the present embodiment, will be explained.

Figure 4:
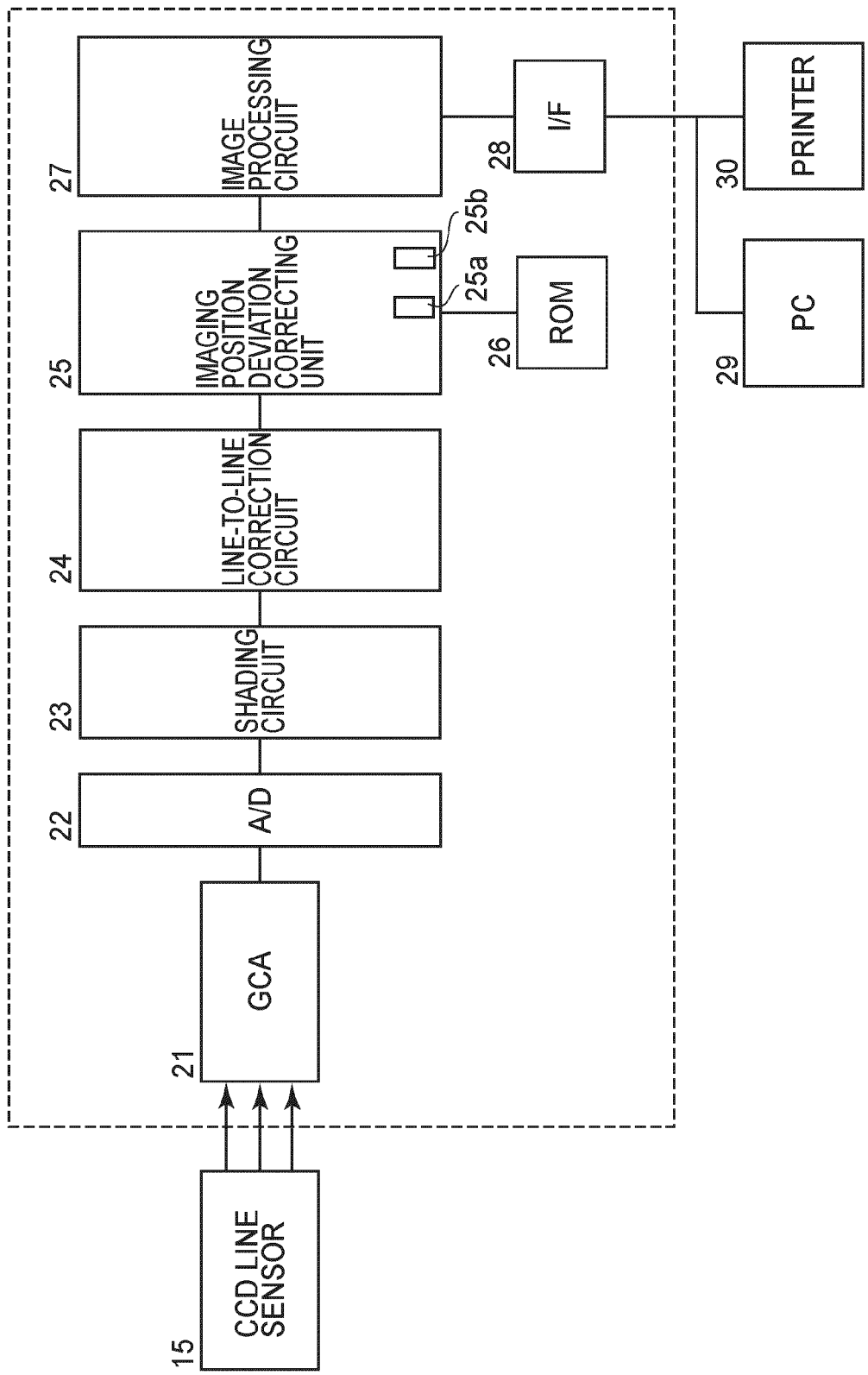
FIG. 4 is a block diagram illustrating a functional structure for correcting the imaging position deviation in the first embodiment of the present invention.

FIG. 4 is a block diagram showing the functional structure for correcting the imaging position deviation in the first embodiment of the present invention. FIG. 5 is a flow chart showing the sequence of data correcting process in the first embodiment of the present invention.

In this embodiment, the signals transmitted from the three line sensors (CCD line sensors) 15 are amplified by a gain control amplifier (GCA) 21 up to a predetermined output level (step 01).

The thus amplified signals are converted into digital data by an analog-to-digital converter 22 (step 02).

The imagewise signal having been converted into digital data undergoes shading compensation in a shading circuit 23 (step 03 and step 04).

The shading compensation is a process for compensating the uniformity of density when an original having a uniform density is read.

More specifically, this is a process for compensating the nonuniformity caused by dispersion of the luminous intensity distribution of the illumination source 13 or dispersion of the picture element sensitivity of the three line sensors 15. To this end, light from the illumination source 13 is projected on a shading board which is a white-colored board, and reflected light therefrom is received by the three line sensors 15.

Based on this, a correction coefficient to be used for the shading compensation is obtained.

By using the thus obtained correction coefficient, shading compensation treatment is carried out to the imagewise data converted into a digital signal. For this shading compensation, any method known in the art is usable.

The imagewise signal after being processed by the shading compensation is supplied to a line-to-line correction circuit 24, and a deviation of time with respect to the sub-scan direction which results from that the three line sensors R, G and B are disposed in the sub-scan direction with predetermined spacings S0 is corrected (step 05 and step 06).

The imagewise signal after being processed by the line-to-line correction is supplied to an imaging position deviation correcting unit (correction amount calculating means) 25.

In the imaging position deviation correcting unit 25, based on the imaging position deviation amount supplied from an ROM 26 (memory means), a positional deviation correction amount is calculated in regard to the imagewise signal supplied from the line-to-line correcting circuit 24, and the correction is carried out. The imagewise signal is then outputted to an image processing circuit (image correcting means) 27 (step 07 and step 08).

The ROM 26 as the memory means has stored therein the imaging position deviation amount (the amount of deviation of an image in the sub-scan direction depending on the reading position with respect to the main-scan direction) which is a calculated value being calculated from the optical design values of the imaging optical system 16 having an anamorphic surface.

Subsequently, in the image processing circuit 27, predetermined image processing such as modulation transfer function (MTF) correction or masking correction is carried out to the imagewise signal (step 09).

Then, the imagewise signal is outputted to a computer (PC) 29 or a printer 30 or the like outside the image reading apparatus through an interface 28.

In this embodiment, by using the imaging position deviation amount stored and memorized in the ROM 26, the imaging position deviation correction amount is calculated by a positional deviation correction amount calculating circuit 25a which is provided inside the imaging position deviation correcting unit 25.

Furthermore, based on the imaging position deviation correction amount, the imagewise information of the original is corrected electrically by a positional deviation correction circuit 25b which is similarly provided inside the imaging position deviation correcting unit 25.

Next, the positional deviation correction (step 08) will be explained in detail.

The positional deviation correction amount calculating circuit 25a performs linear interpolation to the imaging position deviation amount stored in the ROM 26, and calculates the imaging position deviation correction amount with respect to every picture element.

The linear interpolation uses a linear interpolation function (nth multinomial expression) shown below.

When the imaging position deviation amount is y and the reading position in the main-scan direction is x, $$y = Ax^n + Bx^{(n-2)} + Cx^{(n-4)} + Dx^{(n-6)} + \quad (1)$$

where n is a multiplier of 1 or 2, and A, B, C, D . . . are interpolation correction coefficients.

In this embodiment, the ROM 26 stores therein the calculated value which is calculated from the reading position in the main-scan direction as well as the optical design values of the imaging optical system at nine points.

Subsequently, in the positional deviation correction amount calculating circuit 25a, linear interpolation is performed using a sixth multinomial expression, and the imaging position deviation amount of each picture element is calculated.

In other words, based on the imaging position deviation amount in the sub-scan direction depending on the reading position with respect to the main-scan direction as stored in the ROM 26 and by using the linear interpolation function, interpolation correction coefficients are calculated.

Then, using these interpolation correction coefficients, the imaging position deviation amount of each of the picture elements of each of the line sensors 15R, 15G and 15B is calculated.

Then, from the imaging position deviation amount Px of each picture element 11 of each of the line sensors, the imaging position deviation correction amount for each of the picture elements of each of the line sensors is calculated.

In other words, the imaging position deviation correction amount of each picture element 11 is so determined to remove the imaging position deviation amount Px of each picture element.

Then, using the imaging position deviation correction amount of each picture element, the imagewise information of the original surface having been read by each of the plurality of line sensors is corrected (step 09).

Figure 6:
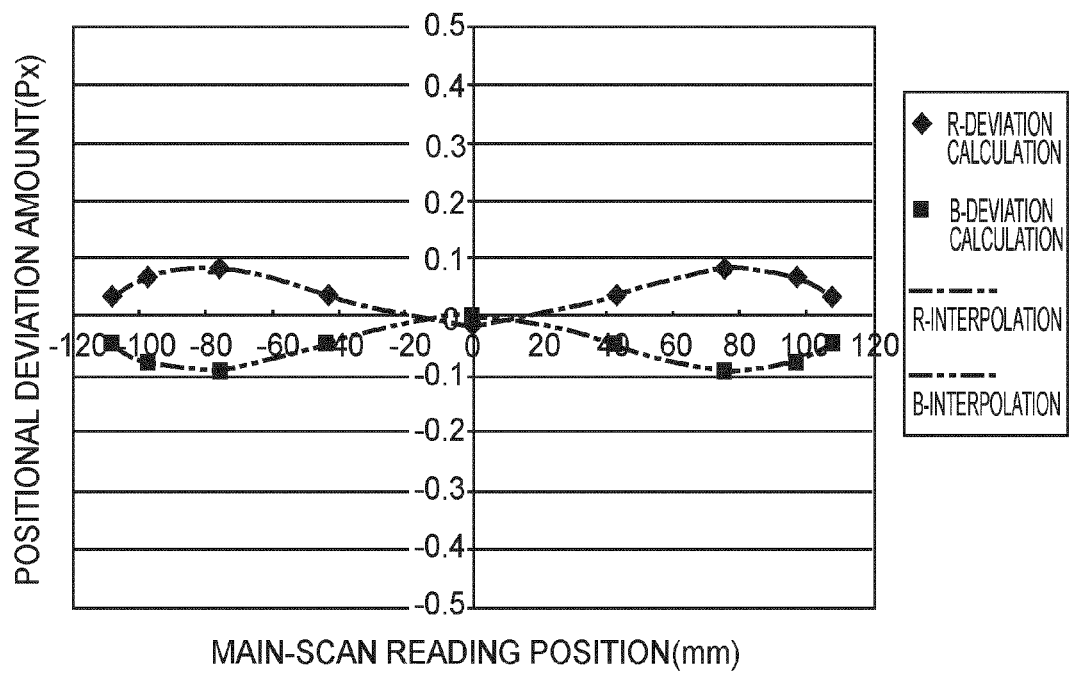
FIG. 6 is a diagram illustrating the relationship between the amount of deviation of an optical design value and the amount of deviation calculated by a linear interpolation function, in the first embodiment of the present invention.

FIG. 6 shows a graph derived from the aforementioned calculated values and the linear interpolation function.

It is seen from the results that, since the calculated values calculated from the optical design values of the imaging optical system are put on the graph derived from the linear interpolation function, the imaging position deviation is well corrected by the linear interpolation function.

If it is desired to correct the imaging position deviation more effectively, more reading position or positions (computation points) in the main-scan direction may be set or, alternatively, a higher order linear interpolation may be carried out.

Numerical example 1 of the imaging optical system comprised of a dioptric systems will be shown below.

Figure 14:
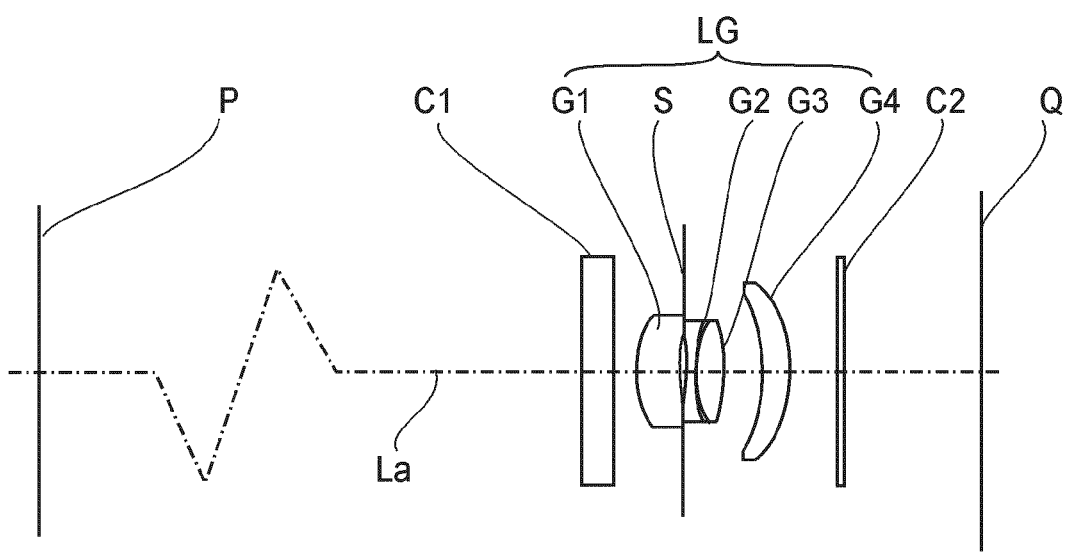
FIG. 14 is a lens sectional view in numerical example 1 of the present invention.

The image reading lens LG in FIG. 14 has the following structure in an order from the original surface P side to the photoelectric converting element Q side.

That is, it comprises a first lens G1 of positive refracting power (this being referred to as "positive") having a meniscus shape with a convex surface facing to the original surface P side, a stop S, a second lens G2 of bi-concave shape at both lens surfaces thereof, and a third lens G3 of bi-convex shape at both lens surfaces thereof.

Furthermore, it comprises a fourth lens G4 of meniscus shape with a convex surface facing to the photoelectric converting element Q side.

A telephoto type optical system is provided by these four lenses.

The fourth lens G4 has a light entrance surface (first surface) and a light exit surface (second surface) each being comprised of an anamorphic optical surface having different powers in the main-scan direction and the sub-scan direction.

Figure 13:
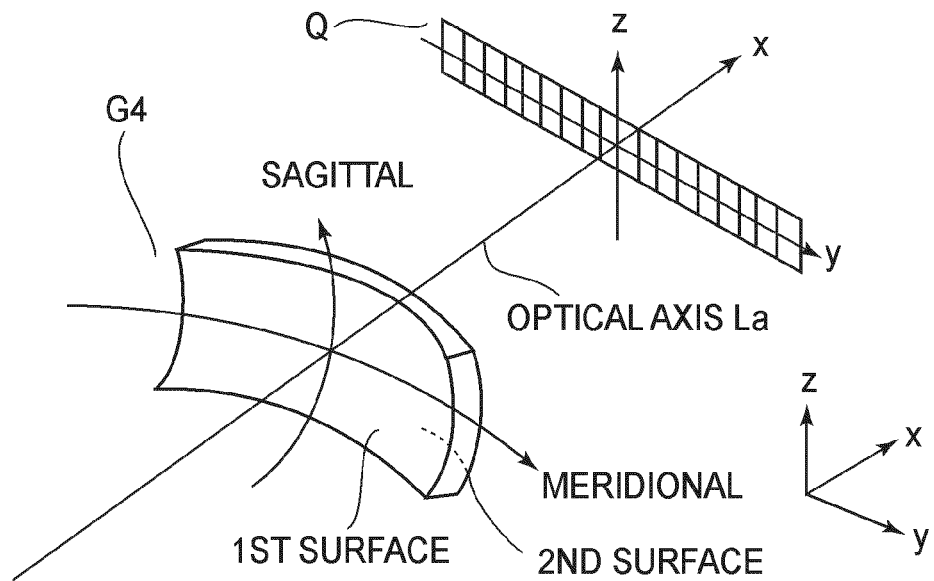
FIG. 13 is a perspective view illustrating the relationship with a fourth lens and a CCD.

Here, as shown in FIG. 13, the sectional shape in the main-scan section (x-y section) which contains the optical axis La (x direction) defined by the first to third lenses G1-G3 having a rotationally symmetric surface and the array direction (main-scan direction) of the picture elements of the photoelectric conversion element Q, is taken as meridional.

The anamorphic surface is such surface that, on the optical axis La, the curvature of the meridional in the main-scan section and the curvature of the sagittal in a direction (sub-scan direction, z direction or sagittal direction) which is perpendicular to the main-scan section are equal to each other.

Also, in the anamorphic optical surface, the curvature in a direction perpendicular to the main-scan section changes continuously from the optical axis La toward the periphery along the meridional direction (y direction).

In the present embodiment, the curvature of the sagittal corresponds to the curvature which is defined in a plane perpendicular to the main-scan section and containing a normal to the anamorphic optical surface at an arbitrary position in the meridional direction.

In other words, the curvature of the sagittal is the curvature which is defined in a plane perpendicular to the main-scan section and containing a line perpendicular to the tangent line of the meridional shape at an arbitrary position in the meridional direction.

The curvature of the meridional is the curvature at an arbitrary position in the meridional direction within the main-scan section.

Table 1 shows the lens shape of numerical example 1 (FIG. 14).

In the image reading lens LG shown in the Table 1, the surface number i denotes the ordinal number of the surface in an order from the original surface P side, $r_i$ denotes the curvature radius of each surface, $d_i$ denotes the material thickness or air spacing between the (i)th surface and (i+1)th surface, and $n_i$ and $v_i$ denote the refractive index and Abbe's number with reference to d line, respectively.

The shape of the anamorphic optical surface has an aspherical shape which can be depicted as follows, using coefficients shown in Table 2 regarding numerical example 1.

With regard to the aspheric shape having a refracting power rotationally asymmetric with respect to the optical axis, when the point of intersection between the lens surface and the optical axis is taken as an origin, the optical axis direction is taken as an x-axis, an axis orthogonal to the optical axis in the main-scan section is taken as a y-axis, and an axis orthogonal to the optical axis in the sub-scan section is taken as a z-axis, the meridional shape X is represented by an expression below.

$$X = \frac{\frac{y^2}{R}}{1+\sqrt{1-(1+k_y)\left(\frac{y}{R}\right)^2}} + B_4 y^4 + B_6 y^6 + B_8 y^8 + B_{10} y^{10}$$

where R is the curvature radius, and $k_y$, $B_4$, $B_6$, $B_8$ and $B_{10}$ are aspherical coefficients.

On the other hand, the sagittal shape S is represented by an expression below, taking a plane which is perpendicular to the meridional, upon the meridional, as a section.

$$S = \frac{\frac{z^2}{r'}}{1+\sqrt{1-(1+K_z)\left(\frac{z}{r'}\right)^2}} + D_4 z^4 + D_6 z^6 + D_8 z^8 + D_{10} z^{10}$$

where $r_0$ is the curvature radius of the sagittal (sub-scan direction) on the optical axis and $R=r_0$, and $D_2$, $D_4$, $D_6$, $D_8$, $D_{10}$, $E_2$, $E_4$, $E_6$, $E_8$ and $E_{10}$ are aspherical coefficients.

TABLE 1

(Dioptric System)
(Numerical Example 1)

| i | r | d | n | v |
|---|---|---|---|---|
| 1 | 8.738 | 4.09 | 1.6968 | 55.5 |
| 2 | 17.564 | 0.30 | | |
| Stop | | 0.29 | | |
| 3 | −21.224 | 0.80 | 1.6889 | 31.1 |
| 4 | 9.183 | 0.22 | | |
| 5 | 15.933 | 2.52 | 1.7859 | 44.2 |
| 6 | −15.933 | 3.58 | | |
| 7 | −16.473 | 2.54 | 1.5299 | 55.8 |
| 8 | −15.479 | | | |

TABLE 2

Aspherical Coefficient

| $R_7$ | R = −1.64728e+01 | $k_y$ = −1.84944e+01 |
|---|---|---|
| $B_4$ = −5.27070e−04 | $B_6$ = −4.64414e−06 | $B_8$ = 2.53780e−07 |
| $B_{10}$ = −1.40767e−09 | r = −1.64728e+01 | $k_z$ = −1.84944e+01 |
| $D_4$ = −5.27070e−04 | $D_6$ = −4.64414e−06 | $D_8$ = 2.53780e−07 |
| $D_{10}$ = −1.40767e−09 | $E_2$ = −1.09526e−02 | $E_4$ = 5.48963e−04 |
| $E_6$ = −7.87887e−05 | $E_8$ = 2.24283e−06 | $E_{10}$ = 2.72348e−08 |
| $R_8$ | R = −1.54788e+01 | $k_y$ = −3.67827e+01 |
| $B_4$ = −1.43745e−04 | $B_6$ = −7.17630e−06 | $B_8$ = 1.12108e−07 |
| $B_{10}$ = −9.09659e−10 | r = −1.54788e+01 | $k_z$ = −3.67827e+01 |
| $D_4$ = −1.43745e−04 | $D_6$ = −7.17630e−06 | $D_8$ = 1.12108e−07 |

TABLE 2-continued

Aspherical Coefficient $D_{10} = -9.09659\text{e}{-10}$   $E_2 = -1.03699\text{e}{-03}$   $E_4 = -2.66581\text{e}{-04}$
$E_6 = 9.01446\text{e}{-06}$   $E_8 = -1.02243\text{e}{-06}$   $E_{10} = 2.63927\text{e}{-08}$ Using optical design values in Table 1 and Table 2, the optical designing of the imaging optical system 16 is carried out.

The imaging position deviation amount of the image in the sub-scan direction which corresponds to the reading position in the main-scan direction as well as the reading position in the main-scan direction calculated from the optical design values of the imaging optical system at nine points, is such as shown in FIG. 6.

In FIG. 6, when the image of a single line on the original surface is imaged by the imaging optical system 16 on three line sensors 15B, 15G and 15R, the image of the image line 11G read by the G-color line sensor 15G is taken as a reference.

Here, the diagram of FIG. 6 illustrates the imaging-position-deviation calculated amount Px of the image in the sub-scan direction perpendicular to the picture element array direction (main-scan direction) in the image of the reference line 11G relative to the image of a single line read by the R-color line sensor 11R or B-color line sensor 11B.

The axis of abscissas in FIG. 6 shows the reading position (mm) in the main-scan direction, upon the line sensor, and the axis of ordinate shows the imaging-position-deviation calculated amount Px (picture element) of the image with respect to the sub-scan direction.

When optical designing of the imaging optical system 16 is made using the optical design values of Table 1 and Table 2, as shown in FIG. 6 the imaging-position-deviation calculated amount Px for R of the image in the sub-scan direction takes a maximum value at the reading position ±77 mm.

Similarly, the imaging-position-deviation calculated amount Px for B of the image in the sub-scan direction takes a maximum value at the reading position ±77 mm.

Therefore, the imaging position deviation correction amount for R of the image in the sub-scan direction should be set to −0.08 pixels (absolute value) at the reading position ±77 mm.

Similarly, the imaging position deviation correction amount for B of the image in the sub-scan direction should be set to +0.09 pixel (absolute value) at the reading position ±77 mm.

In the manner described above, in the present embodiment, the imaging-position-deviation calculated amount in the sub-scan direction corresponding to the reading position in the main-scan direction, which is peculiar to an optical system having an anamorphic surface as explained hereinbefore, is detected and, from this result, the imaging position deviation correction amount is calculated based on the linear interpolation.

With the procedure described above, color drift in the sub-scan direction which results from a magnification error in the sub-scan direction can be well corrected.

[Embodiment 2]

Figure 7:
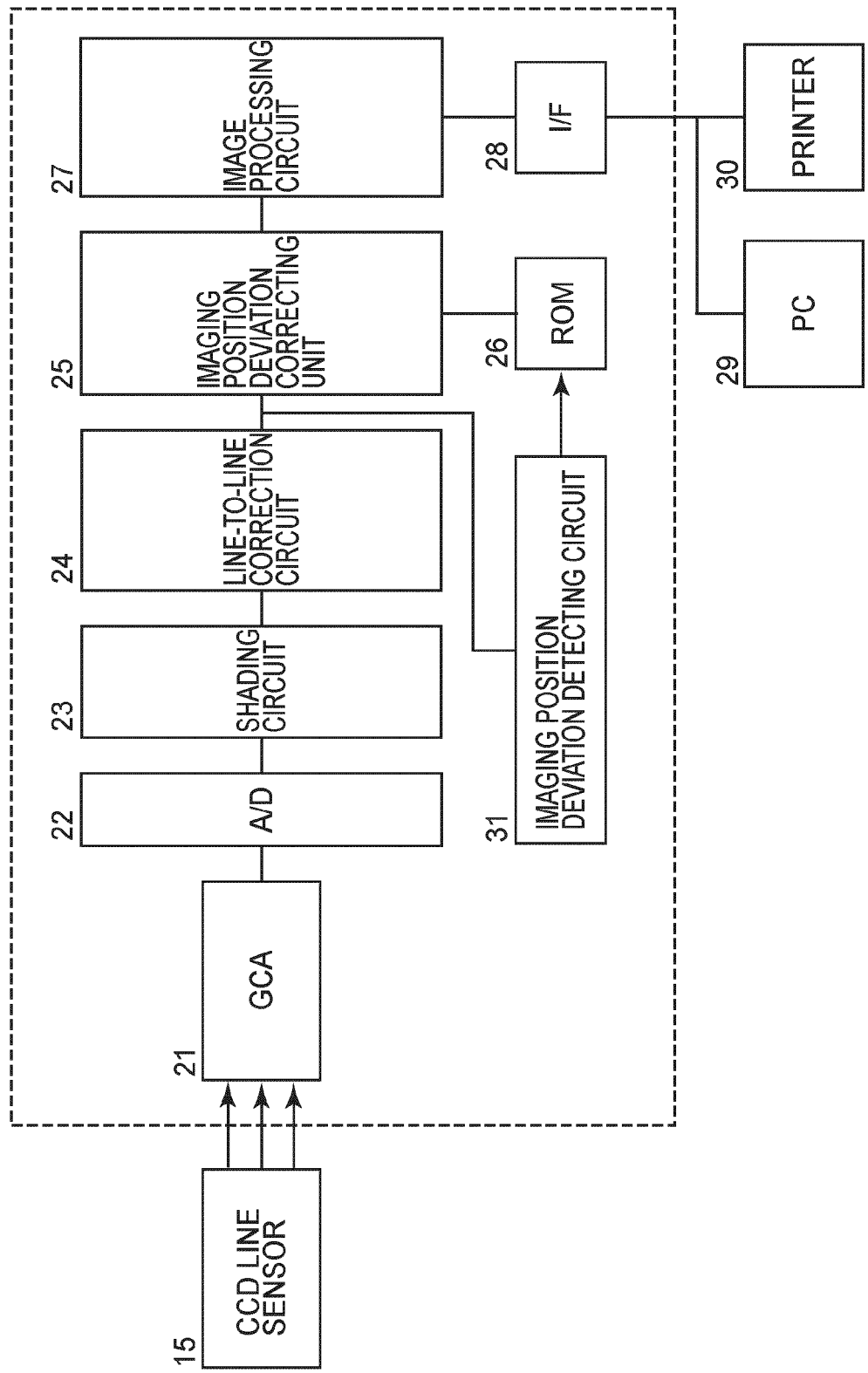
FIG. 7 is a block diagram illustrating a functional structure for correcting the imaging position deviation in a second embodiment of the present invention.
Figure 8:
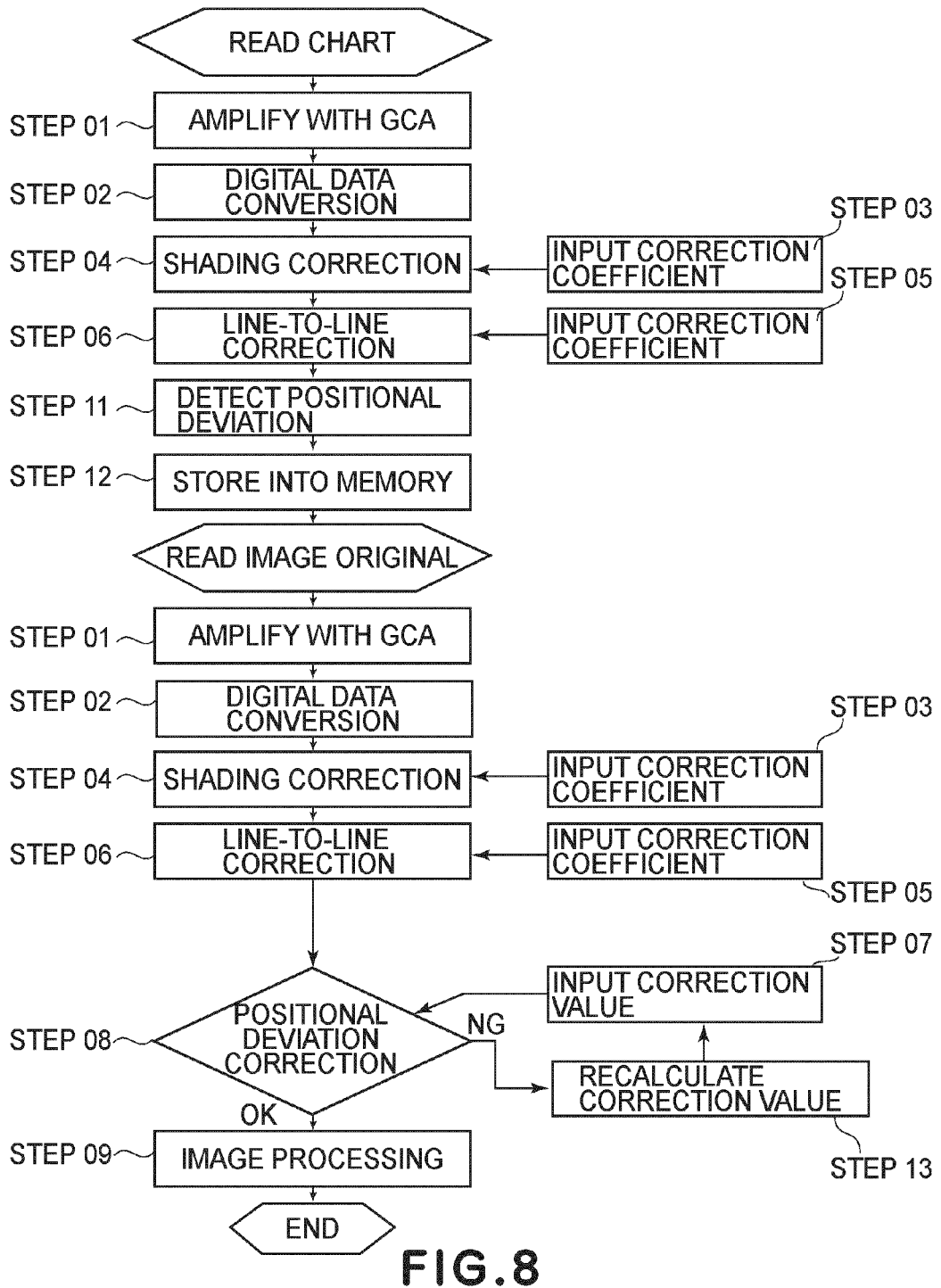
FIG. 8 is a diagram of flow chart, illustrating the sequence of data correcting process in the second embodiment of the present invention.

FIG. 7 is a block diagram showing the functional structure for correcting the imaging position deviation, in a second embodiment of the present invention. FIG. 8 is a flow chart illustrating the sequence of data correcting process in the second embodiment of the present invention.

Figure 5:
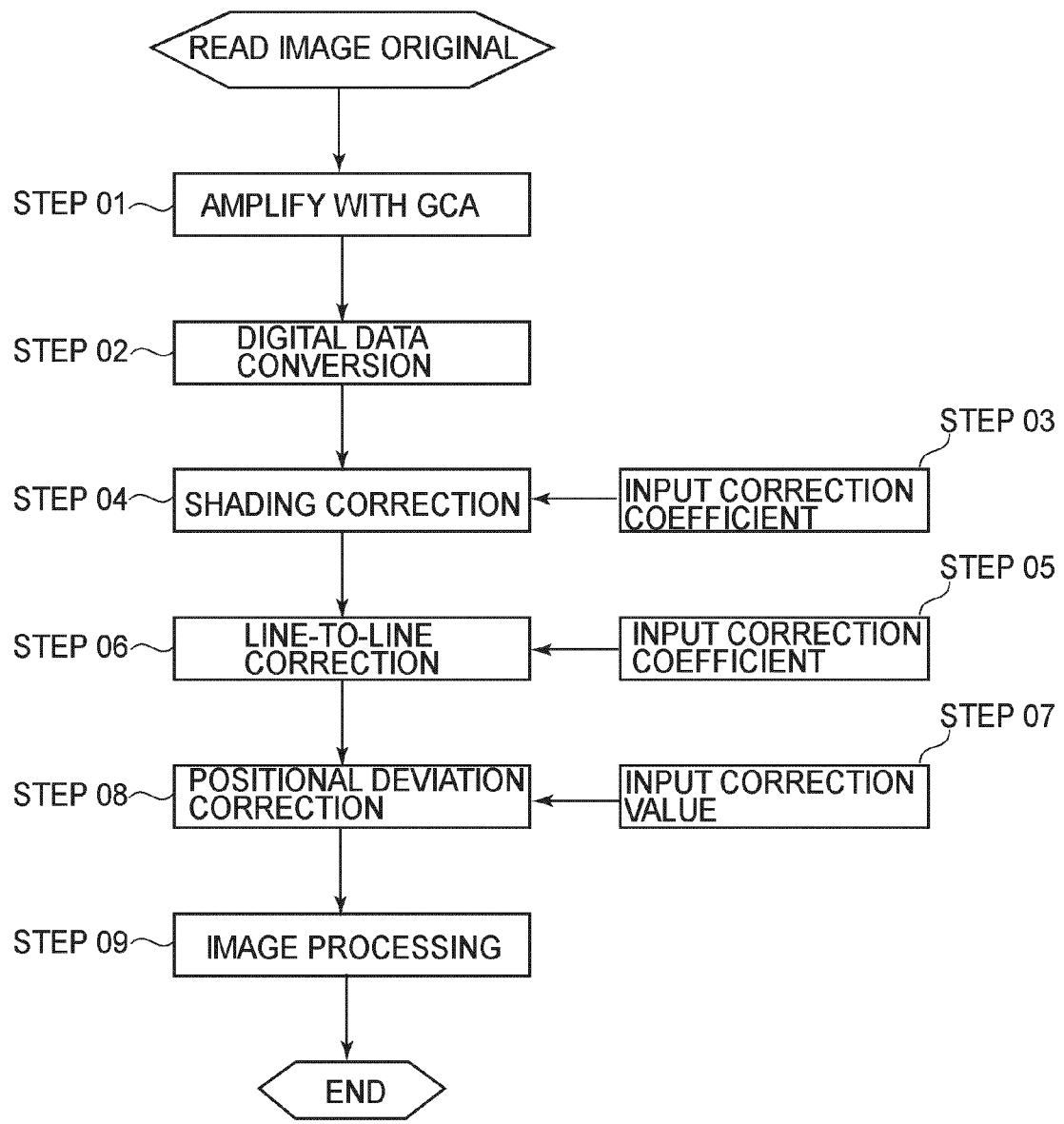
FIG. 5 is a diagram of flow chart, illustrating the sequence of data correcting process in the first embodiment of the present invention.

In FIG. 7 and FIG. 8, like numerals are assigned to components corresponding to those of FIG. 4 and FIG. 5.

The present embodiment differs from the abovementioned first embodiment in that color drift in the sub-scan direction is corrected while taking into account the imaging position deviation which might be caused by a factor (e.g., machine precision) other than the optical design value of the imaging optical system.

The remaining structures and optical function are similar to those of the first embodiment and, based on this, similar advantageous effects are obtainable.

More specifically, in this embodiment, a chart shown in FIG. 9 to be described below is actually measured through the imaging optical system, and from the measured results, the imaging position deviation amount of the chart is detected by using detecting means (imaging position deviation detecting circuit 31). The thus detected imaging position deviation amount is stored into memory means 26.

The aforementioned detecting means 31 detects the imaging position deviation amount in the sub-scan direction at an arbitrary reading position in the main-scan direction.

Figure 9:
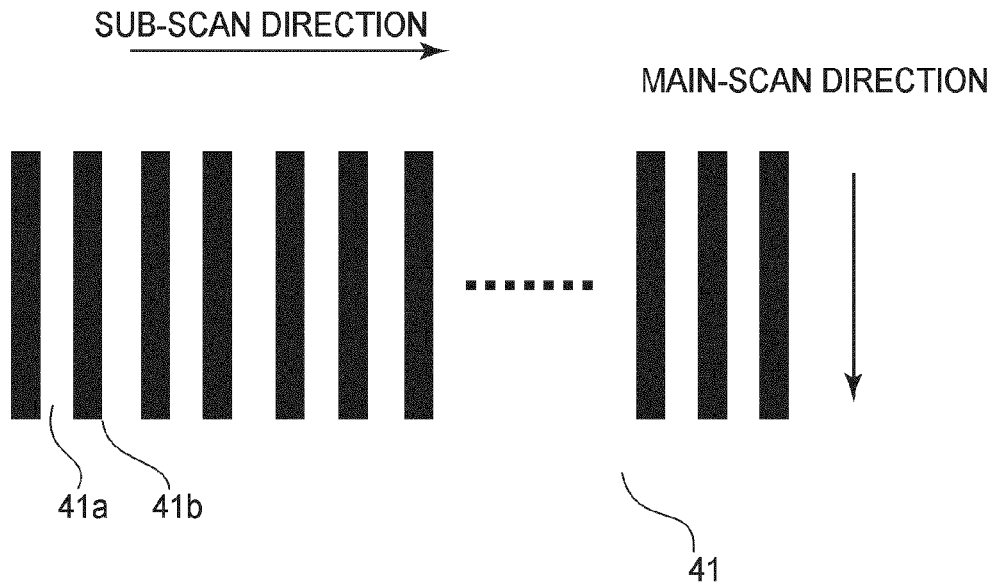
FIG. 9 is a chart diagram for detection of the imaging position deviation in the second embodiment of the present invention.

The detecting means of the present embodiment is configured so that, after having read the chart shown in FIG. 9 which is comprised of white and black lines alternately arrayed in the array direction of the picture elements with regular intervals and disposed at the position corresponding to the original surface position, by use of reading means, the imaging position deviation amount is detected on the basis of the data obtained by the reading.

FIG. 9 illustrates the chart for imaging position deviation detection. In FIG. 9, denoted at 41 is the chart for detecting the imaging position deviation. It comprises white lines 41a and black lines 41b alternately arrayed in the main-scan direction with regular intervals. In this embodiment, a chart 41 having resolution of 100 dpi is used.

Next, referring to FIG. 7 and FIG. 8, the method of correcting the imaging position deviation in the sub-scan direction depending on the reading position in the main-scan direction, in this embodiment, will be explained.

In this embodiment, the chart 41 is placed at a position equivalent to the original surface, and it is read by suitable means similar to the reading means for the imagewise information of the original.

The image data of the chart 41 being read is processed in the same way as that by the reading means for the imagewise information of the original, up to the process by the line-to-line correction circuit 24 (step 01 through step 06). Thus, the imaging position deviation amount is detected by the imaging position deviation detecting circuit 31 (detecting means).

The following procedure is carried out in the imaging position deviation detecting circuit 31.

Figure 10:
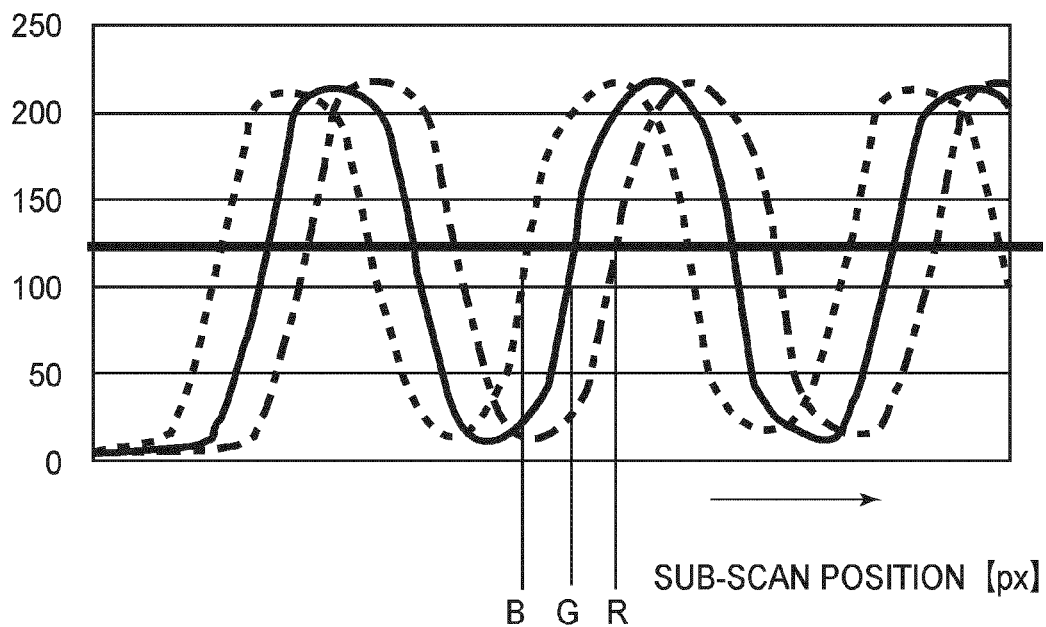
FIG. 10 is a diagram illustrating the output of a CCD line sensor when the imaging position deviation detecting chart in the second embodiment of the present invention is scanned.

When the imagewise data of three colors of R, G and B having completed the procedure up to the line-to-line correction (step 06) is plotted as a graph, taking, in an arbitrary main-scan direction, the position in the sub-scan direction (sub-scan position) on the axis of ordinate while taking the output of CCD (CCD output) on the axis of abscissas, a graph such as shown in FIG. 10 is obtainable.

It is seen in FIG. 10 that, relative to the reference color G at the optical axis center, in the edge portion of the chart 41 the output waveforms of the R and B colors are deviated in the sub-scan direction.

With regard to the amount of deviation of this sub-scan position, an arbitrary output value among the output values of the CCD is chosen as a threshold V and, when the outputs for R, G and B colors reach this threshold V, the amount of deviation of each color of R and B relative to the output of color G is detected as the imaging position deviation amount (step 11).

Threshold V in the present embodiment is based on the mean value of the maximum output value and the smallest output value of the CCD outputs.

The imaging position deviation amount detected by such procedure is stored into the ROM 26 (memory means) like the first embodiment (step 12).

With this procedure, correction of color drift in the sub-scan direction, taking into account the imaging position deviation amount to be produced by a factor (e.g., machine precision) other than the optical design values of the imaging optical system, is enabled.

Subsequently, the imagewise information of the original is processed in the same way as by the reading means for the imagewise information of the original in the abovementioned first embodiment (01 step-steps 06).

Since in this embodiment, as described above, the imaging position deviation amount is detected based on the chart 41, the imaging position deviation amount in the sub-scan direction can be detected throughout the whole region in the main-scan direction.

Since, as a result of this, a lot of detection result data should be approximated based on the linear interpolation function, the imaging-position-deviation correction amount should be calculated by using a multinomial expression of appropriate order.

In consideration of this, a correction residue is calculated, and whether the positional deviation correction is good or not is discriminated by using a correction residue discriminating circuit (not shown) (step 8).

Here, if the correction residue is large, another linear interpolation function having an increased order is generated, and a separate imaging position deviation correction amount is calculated using it (step 13 and step 07).

Subsequently, the procedure of step 08, step 13 and step 07 is repeated until good positional deviation correction is done. The result is transmitted to the image processing circuit 27.

The image processing circuit 27 performs predetermined image processing such as modulation transfer function (MTF) correction or masking correction to the imagewise signal (step 09).

The imagewise signal is outputted to a computer (PC) 29, a printer or the like connected to the outside of the image reading apparatus through an interface 28.

Figure 11:
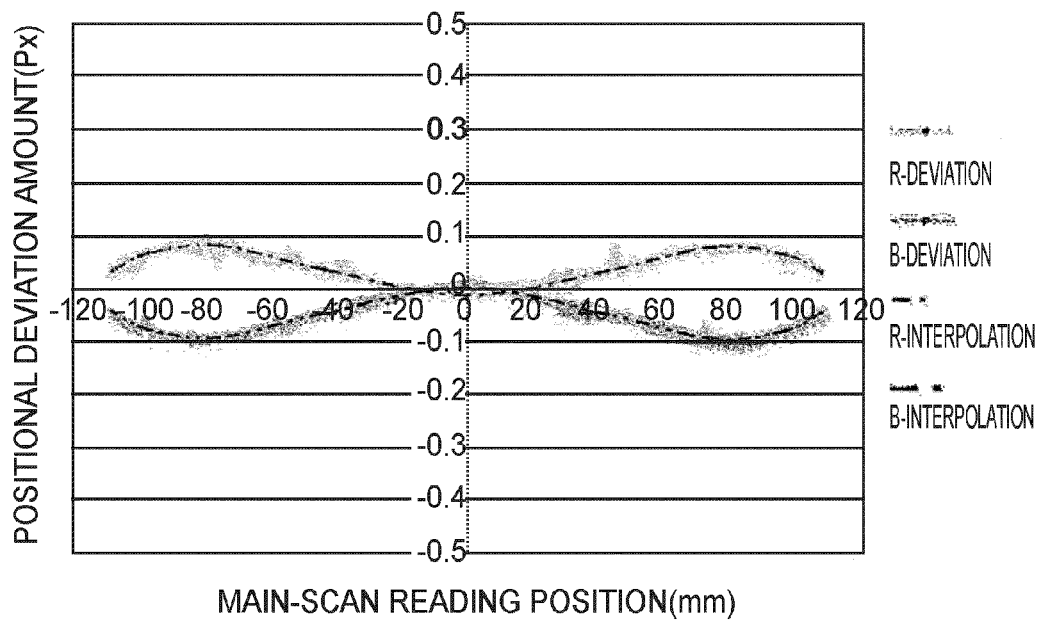
FIG. 11 is a diagram illustrating the relationship between the deviation amount detected using the chart in the second embodiment of the present invention and the deviation amount calculated by a linear interpolation function.
Figure 12:
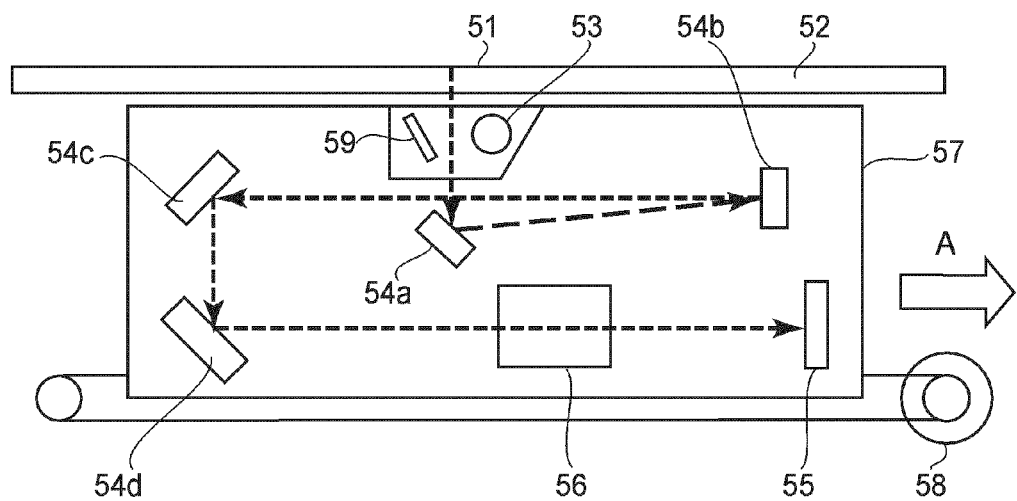
FIG. 12 is a schematic diagram illustrating a basic structure of an optical system of a conventional image reading apparatus.

FIG. 11 illustrates a graph based on the results of detection of the imaging position deviation amount and the linear interpolation function in the present embodiment. In FIG. 11, a thick line depicts the detection result of the imaging position deviation amount, and a broken line depicts the deviation amount calculated by the linear interpolation.

It is seen that, in the present embodiment as well, like the abovementioned first embodiment, the imaging position deviation is well corrected well based on the linear interpolation function.

In this embodiment as described above, by using detecting means in the manner explained above, the imaging position deviation correction amount can be calculated while taking into account the variation peculiar to individual machines. Therefore, the color drift correction in the sub-scan direction can be made with hither precision.

Here, it should be noted that the embodiments described above are mere examples suitable for an image reading apparatus of the present invention, and the present invention is not limited to these.

For example, although these embodiments use memories (positional deviation data memories) corresponding to the line sensor R, G and B, respectively, the imaging position deviation amounts of respective colors may be memorized into a single memory.

In addition to this, with regard to the detailed structure and operation of the image reading apparatus as well, various modifications can be done without departing from the scope of the present invention.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-063920 filed Mar. 13, 2008, for which is hereby incorporated by reference.

What is claimed is:

1. An image reading apparatus, comprising:
reading means having a plurality of line sensors extending in a main-scan direction;
an imaging optical system configured to image, on the line sensors, imagewise information of an original surface, said imaging optical system including at least one anamorphic optical surface having different powers in the main-scan direction and the sub-scan direction;
scanning means configured to relatively scan the original surface and said reading means in a sub-scan direction to read the imagewise information of the original surface; and
image correcting means configured to correct imagewise information of the original surface read by each of the line sensors, on the basis of an imaging-position-deviation correction amount of an image in the sub-scan direction corresponding to a reading position in the main-scan direction, calculated based on an imaging position deviation amount of an image in the sub-scan direction corresponding to the reading position in the main-scan direction upon the line sensors, as calculated from optical design value of said imaging optical system.

2. An image reading apparatus as claimed in claim 1, further comprising memory means configured to store the imaging position deviation amount of an image in the sub-scan direction corresponding to the reading position in the main-scan direction upon the line sensors as calculated from the optical design value of said imaging optical system, and correction amount calculating means configured to calculate the imaging-position-deviation correction amount of each of a plurality of picture elements of each line sensor of the plurality of line sensors from the imaging position deviation amount of each picture element of the plurality of picture elements in each line sensor, as calculated using an interpolation correction coefficient having been calculated using a linear interpolation function from the imaging position deviation amount of an image in the sub-scan direction corresponding to the reading position in the main-scan direction stored in said memory means.

3. A method of controlling an image reading apparatus including reading means having a plurality of line sensors extending in a main-scan direction, an imaging optical system configured to image, on the line sensors, imagewise information of an original surface, the imaging optical system including at least one anamorphic optical surface having different powers in the main-scan direction and the sub-scan direction, said method comprising:
relatively scanning the original surface and the reading means in a sub-scan direction to read the imagewise information of the original surface; and correcting imagewise information of the original surface read by each of the line sensors, on the basis of an imaging-position-deviation correction amount of an image in the sub-scan direction corresponding to a reading position in the main-scan direction, calculated based on an imaging position deviation amount of an image in the sub-scan direction corresponding to the reading position in the main-scan direction upon the line sensors, as calculated from optical design value of said imaging optical system.

4. A method of controlling an image reading apparatus as claimed in claim 3, further comprising calculating the imaging-position-deviation correction amount of each of a plurality of picture elements of each line sensor of the plurality of line sensors from the imaging position deviation amount of each picture element of the plurality of picture elements in each line sensor, as calculated using an interpolation correction coefficient having been calculated using a linear interpolation function from the imaging position deviation amount of an image in the sub-scan direction corresponding to the reading position in the main-scan direction.

* * * * *